US005355059A

United States Patent [19]

McMillan

[11] Patent Number: 5,355,059

[45] Date of Patent: Oct. 11, 1994

[54] ELECTRONIC SWITCH ASSEMBLY FOR MOTORIZED WINDOW SYSTEM

[75] Inventor: Scott D. McMillan, Owatonna, Minn.

[73] Assignee: Truth Hardware Corporation, Owatonna, Minn.

[21] Appl. No.: 18,818

[22] Filed: Feb. 18, 1993

[51] Int. Cl.[5] .............................................. H02P 1/58

[52] U.S. Cl. .................................... 318/103; 318/102; 318/266; 318/468

[58] Field of Search ........................ 318/34, 41, 49, 51, 318/53, 54, 65, 101, 102, 103, 104, 112, 264, 265, 266, 286, 293, 434, 452, 466, 467, 468, 469, 484; 388/907.2, 907.5

[56] References Cited

U.S. PATENT DOCUMENTS

| | | | |
|---|---|---|---|
| 4,521,993 | 6/1985 | Tacheny et al. . | |
| 4,544,865 | 10/1985 | Sharp | 318/53 |
| 4,544,866 | 10/1985 | Clemmons et al. | 318/54 |
| 4,608,637 | 8/1986 | Okuyama et al. | 364/424.05 |
| 4,617,758 | 10/1986 | Vetter . | |
| 4,733,145 | 3/1988 | Ohashi et al. | 318/54 |
| 4,933,613 | 6/1990 | Berner et al. . | |
| 4,945,678 | 8/1990 | Berner et al. . | |
| 5,004,961 | 4/1991 | Berner et al. . | |
| 5,006,766 | 4/1991 | Yuhas et al. | 318/53 |
| 5,285,137 | 2/1994 | Midas et al. | 318/280 |

*Primary Examiner*—Bentsu Ro

*Attorney, Agent, or Firm*—Wood, Phillips, VanSanten, Hoffman & Ertel

[57] ABSTRACT

A universal electrical control selectively drives either plural motorized window operators for opening or closing one or more windows, or a motorized window operator and plural motorized locks for opening, closing and locking a window. The electrical control comprises an interface circuit for connection to plural output devices comprising either motorized window operators or motorized window locks. An input switch commands window movement to an open or close position. A control circuit is connected to the interface circuit and the input switch and includes an initialization mode for determining if each output device is a motorized window operator or a motorized lock, and output drive mode operable in response to a command from the input switch for driving the output devices through the interface circuit in a lock sequence or a window sequence dependent upon the initialization mode respectively determining if a motorized window lock is connected or is not connected to the interface circuit. The lock sequence comprises opening any lock prior to opening the window and closing the window prior to closing the lock. The window sequence comprises driving the plural motorized window operators in a select desired sequence.

19 Claims, 9 Drawing Sheets

FIG. 2

ELECTRONIC SWITCH ASSEMBLY FOR MOTORIZED WINDOW SYSTEM

FIELD OF THE INVENTION

This invention relates to windows and, more particularly, to an electronic switch assembly for a motorized window system.

BACKGROUND OF THE INVENTION

A window typically includes a fixed frame and a movable sash. The sash is usually mounted either for slidable movement relative to the frame or is hinged for pivotal movement, to open or close the window. One example of such a window is a casement window. Typically, a casement window is provided with a window operator to aid in manually opening and closing the window. An example of such a window operator is shown in Tucker, U.S. Pat. No. 4,840,075, owned by the assignee of the present application. Such a window operator includes a rotatable shaft driving a linkage mechanism for selectively moving the sash relative to the frame to open or close the window. A handle is secured to the shaft using a set screw for ease of operation.

In addition to the described casement window operator, various forms of window operators have been used for awning type windows in which the operator also includes a rotatable shaft. Similarly, certain skylight windows include a skylight window operator such as shown in Tacheny et at., U.S. Pat. No. 4,521,993, also owned by the assignee of the present application. A skylight window operator also includes a rotatable shaft normally driven by a pole. The skylight window operator can also be used in connection with a double hung window in which the sash is slidably mounted in the frame, as by the window operator chain raising and lowering the sash.

Each of the described window operators is well suited for its intended application. Nevertheless, with skylight windows the use of a manual operator may be problematic due to inaccessibility of the operator. To satisfy these concerns, motorized window operators have been used for skylight window operators, such as disclosed in the above-mentioned Tacheny et al. application, as well as Berner et al. U.S. Pat. No. 4,945,678, also owned by the assignee of the present application.

Having found success with motorized skylight window operators, there exists a desire to provide motorized operators for other types of windows, such as casement windows, awning windows or double hung windows. In connection with such desires, it is important to consider the millions of such window operators already installed and in use for which such motorized functionality is desired. To satisfy this desire, a motorized drive for a manual window operator has been developed as described in Midas, application entitled "Powered Window Operator Drive", Ser. No. 08/019,243, filed Feb. 18, 1993, the specification of which is hereby incorporated by referenced herein. With such a drive, or any motorized window operator, it is necessary to provide a control therefor.

Further, it has been found desirable to provide locking structures which are not operated manually by the occupant of the room, but rather are operated by an electric motor or the like. One such lock is described in Spinar, application entitled "Window Lock", Ser. No. 08/019,099, filed Feb. 18, 1993, the specification of which is hereby incorporated by reference herein. Again, with such a window lock, it is necessary that a suitable control be provided therefor.

More particularly, with the use of such motorized window operators and motorized locks, proper sequencing of each must be utilized to prevent damage. For example, the lock must be opened prior to opening the window. Conversely, the window must be closed prior to closing the lock. To satisfy market demand, such a control must be economical.

Often, a room may include a series of windows having motorized operators. Advantageously, all such windows must be capable of being controlled from a single control. Again, a need exists that such a control be economical.

The present invention is intended to overcome one or more of the problems set forth above in a novel and simple manner.

SUMMARY OF THE INVENTION

In accordance with the invention, there is disclosed an economical electronic control for controlling multiple motorized window operators or a motorized window operator with locks.

Broadly, there is disclosed herein a universal electrical control for selectively driving either plural motorized window operators for opening or closing one or more windows, or a motorized window operator and plural motorized locks for opening, closing and locking a window. The electrical control comprises an interface circuit for connection to plural output devices comprising either motorized window operators or motorized window locks. An input means commands window movement to an open or close position. A control circuit is connected to the interface circuit and the input means and includes initialization means for determining if each output device is a motorized window operator or a motorized lock, and output drive means operable in response to a command from the input means for driving the output devices through the interface circuits in a lock sequence or a window sequence dependent upon the initialization means respectively determining if a motorized window lock is connected or is not connected to the interface circuit. The lock sequence comprises opening any lock prior to opening the window and closing the window prior to closing the lock. The window sequence comprises driving the plural motorized window operators in a select desired sequence.

It is a feature of the invention that the output drive means drives any motorized window operator to one of a plurality of select window open positions according to a length of time an open command is received from the input means.

It is another feature of the invention to provide a power source and all output devices are powered from the power source.

It is another feature of the invention to provide current sense means for sensing current drawn by the interface circuit and powering any output device.

It is yet another feature of the invention that the initialization means is operatively associated with the current sense means for driving each output device and determining if the driven output device is a motorized window operator or a motorized lock in accordance with current sensed by the current sense means.

It is yet an additional feature of the invention that the initialization means is operatively associated with the current sense means for driving each output device to a full open position as determined by sensed current and then driving such output device to a full close position and then full open position and then determining length of time to open or close the window for use in determining window position.

It is yet a further feature of the invention that the output drive means drives any motorized window operator to a select window open position and further comprising means for varying the select position if a select high current level is sensed prior to the window opening to the select position.

There is disclosed in accordance with another aspect of the invention an electrical window operator for driving plural motorized window operators for opening or closing one or more windows or motorized locks for locking a window. The electrical control comprises an interface circuit for connection to plural output devices comprising either motorized window operators or motorized window locks. An input means commands window movement to an open or closed position. A control circuit is connected to the interface circuit and the input means and includes initialization means for driving each output device to cycle the output device to determine time to open or close the window or open or close the lock. The time is used to determine actual position according to subsequent length of time any such output device is driven. An output drive means is operable in response to a command from the input means for driving the output devices through the interface circuit until actual position reaches a position commanded by the input means.

Further features and advantages of the invention will be readily apparent from the specification and from the drawing.

DETAILED DESCRIPTION OF THE INVENTION

Figure 1:
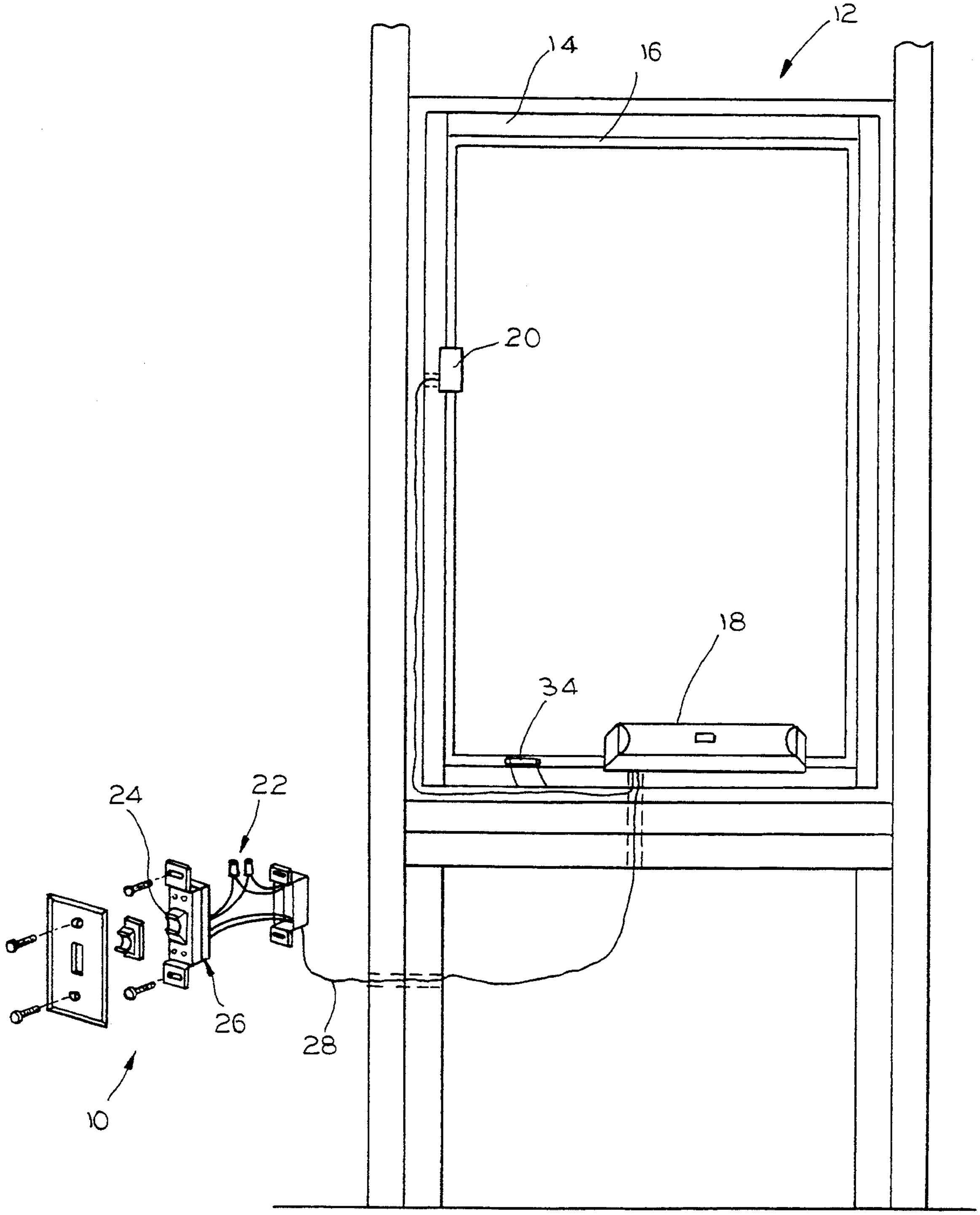
FIG. 1 is an elevation view of a casement window including a motorized window system according to the invention.

With reference to FIG. 1, a motorized window system 10 is shown in association with a casement window 12. The casement window 12 includes a fixed frame 14 and a sash 16 supported relative to the frame by hinges (not shown) along a right vertical edge.

The window 12 is selectively opened or closed by a motorized window operator 18. The motorized operator 18 may comprise a window operator similar to that described in Tucker, U.S. Pat. No. 4,840,075, the specification of which is hereby incorporated by reference herein. Such a window operator includes a rotatable shaft rotatable for operation of a gearing for operating a linkage mechanism connected to the sash 16. Also included with such a window operator would be a motorized drive which may be similar to that described in the Midas application previously incorporated by reference herein, which includes a motor and gear arrangement for driving the operator shaft to selectively open or close the window.

The motorized window system 10, in addition to the motorized operator 18, includes a motorized lock 20. The lock may be similar to that described in the Spinar application previously incorporated by reference herein. Such a lock 20 mounts on the window frame 14 for selectively grasping a keeper on the window sash 16 to secure the sash 16 closed against the frame 14.

Each of the motorized operator 18 and motorized lock 20 is controlled by a wall mounted control unit 22. The control unit 22 includes a rocker switch 24 for commanding opening or closing of the window 12 and a circuit 26 operating in response to movement of the rocker switch 24 for controlling power on conductors 28 to both the motorized operator 18 and motorized lock 20, as described below.

Figure 2:
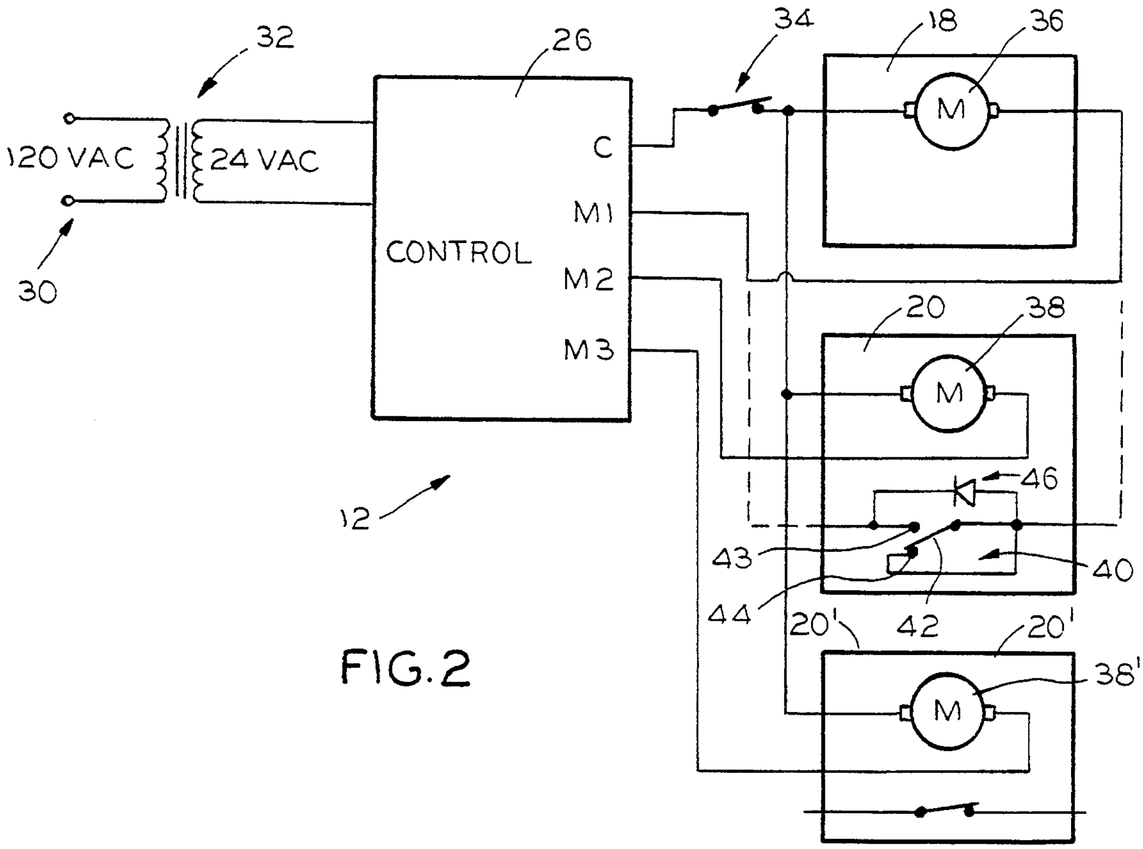
FIG. 2 is a wiring diagram illustrating interconnection of the components of the system of FIG. 1.

With reference to FIG. 2, a generalized schematic/-block diagram illustrates a typical installation for the motorized window system 12. The control 26 receives power from a conventional 120 volt supply 30 through a transformer 32 to provide a 24 volt AC, class 2 circuit. The transformer 32 is connected to the control 26. The control 26 includes four outputs, one of which, labeled C, is a common. The other outputs, labeled M1, M2 and M3, comprise power outputs for driving up to three motors. In the illustrated embodiment, the control 26 is connected to the motorized operator 18 and the lock 20. Additionally, the control 26 may be connected to a second lock 20′ identical to the first lock 20. This is used in taller windows in which two locks are used instead of one.

The common output C is connected to a screen interlock 34. The screen interlock 34 is also shown in FIG. 1 and comprises a shorting bar which senses presence or absence of a window screen. Particularly, such an interlock may be used to prevent opening of the window 12 if the screen is not present. This interlock is optional. The screen interlock contact 34 is in turn connected to a common side of a motor 36 for the motorized operator 18, a motor 38 for the lock 20 and a motor 38′ for the lock 20′. The opposite side of the operator motor 36 is connected to the M1 output. The opposite side of the lock motor 38 is connected to the M2 output. The opposite side of the second lock motor 38′ is connected to the third output M3.

The lock 20 used in the illustrated embodiment of the invention, also includes a control switch 40. The control switch 40 includes a movable contact 42 and first and second fixed contacts 43 and 44. When the window is open (i.e., there is no keeper in the lock) the movable contact 42 is in contact with the first fixed contact 43. When the window is closed (i.e., there is a keeper in the lock 20), then the movable contact 42 is in contact with the second fixed contact 44. The second fixed contact 44 is connected through a diode 46 to the first fixed contact 43.

The control switch 40 may be used to provide a shut off for the operator motor 36 as by connecting the operator motor 36 through the control switch 40 to the M1 output. This is used to stop the motorized operator 18 once the window sash 16 is moved to a closed position, as described below. The diode 46 allows reverse polarity power to be connected to the operator motor 36 in order to open the window.

Figure 3:
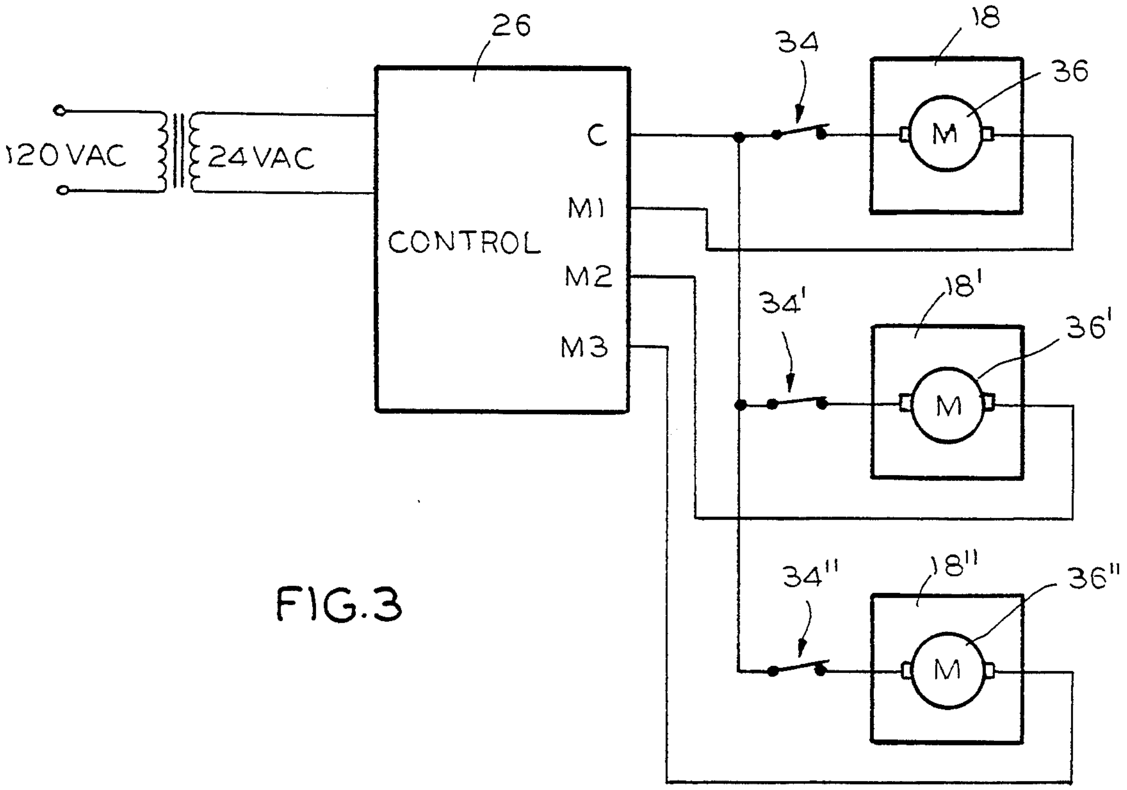
FIG. 3 is a wiring diagram similar to FIG. 2 for an alternative application of the motorized window system according to the invention.

In addition to controlling a window having a single operator and up to two locks, the control 26 can be used for controlling multiple motorized window operators 18, 18' and 18'', see FIG. 3. For this application, the common output C is connected to a screen interlock 34, 34' and 34'' for each window, which is in turn connected to its associated operator motor 36, 36' and 36''. The opposite sides of the motors 36, 36' and 36'' are in turn connected to the respective motor control outputs M1, M2 and M3.

In accordance with the invention, the control 26 can sense whether the device connected to any motor output M1, M2 or M3 is a motorized window operator or a motorized lock and adjust a control sequence accordingly.

Although shown herein with a casement window, the motorized window system 10 could also be used in connection with motorized operators for other types of windows, such as awning windows, skylight windows or double-hung windows.

Figure 4A:
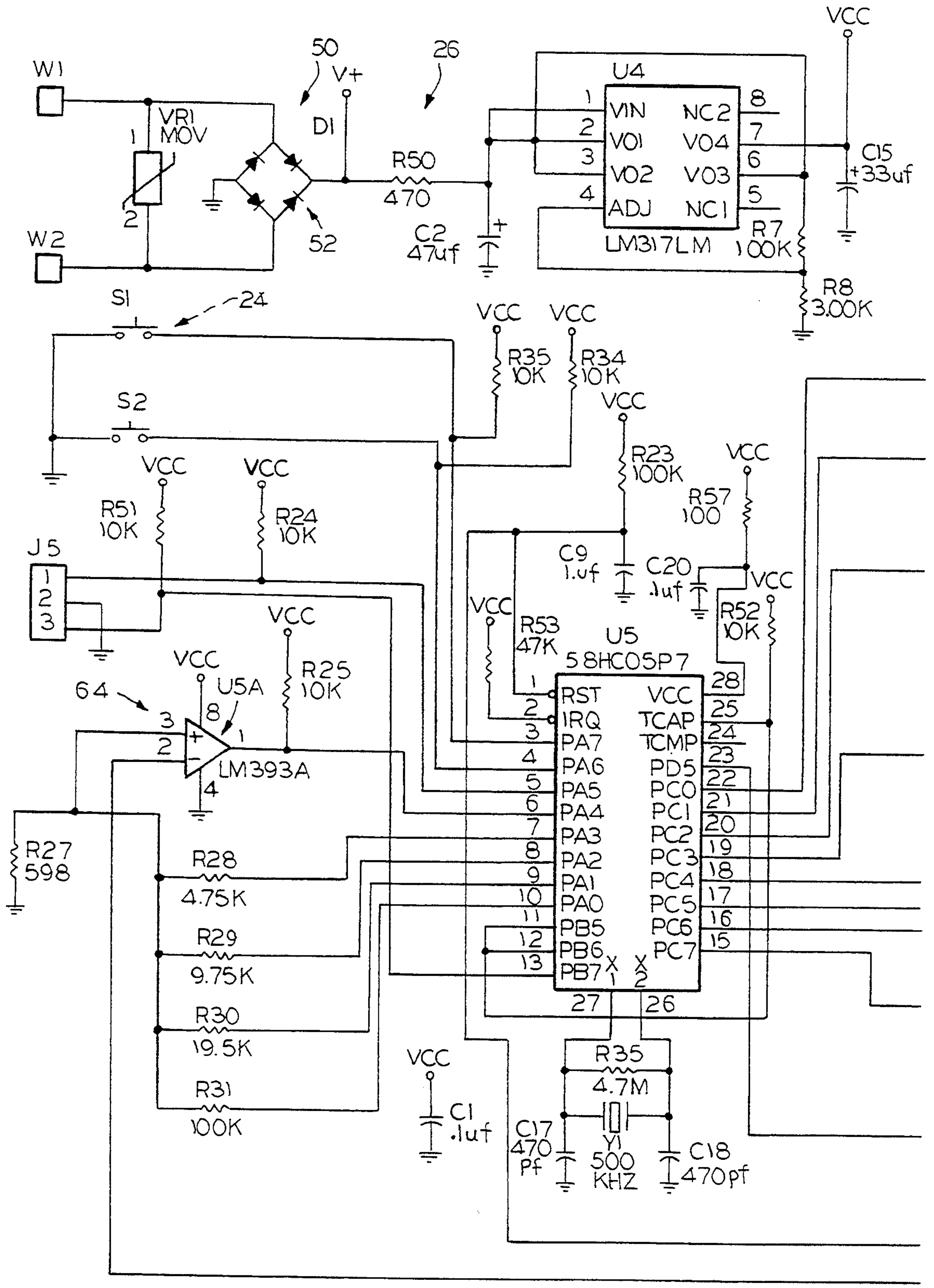
FIG. 4 is an electrical schematic for the control of the window system of FIG. 1.
Figure 4B:
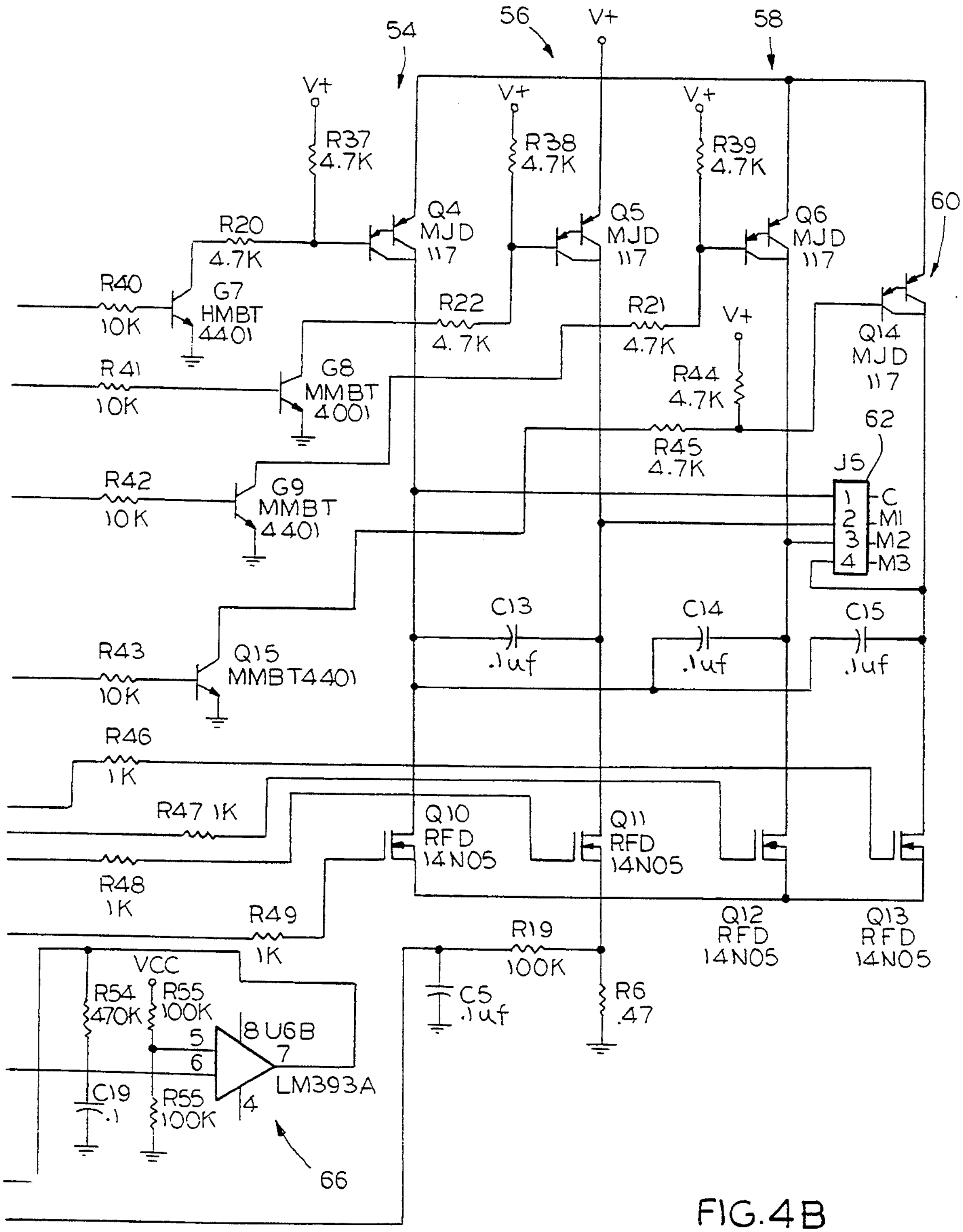

Referring to FIG. 4, an electrical schematic illustrates the circuit used for the control 26. Input power is received at terminals W1 and W2 being connected to the transformer 32, see FIG. 2. Terminals W1 and W2 are connected to a power supply circuit 50 including a full wave bridge rectifier 52 developing unregulated DC voltage at a node labeled V+. The rectifier 52 is also connected to a voltage regulator circuit chip U4 for developing regulated DC voltage at a node labeled VCC.

All logic functions in the control 26 are implemented in a microcontroller U5. In the illustrated embodiment of the invention, the microcontroller U5 comprises a Motorola 68HC05P7 microcontroller containing onboard program memory.

A command input to the microcontroller U5 comes from switch contacts S1 and S2 associated with the rocker switch 24, see FIG. 1. The switch contact S1 is closed to commands that the window be opened. The switch contact S2 is closed to command that the window be closed. The status of each switch contact S1 and S2 is scanned by the microcontroller U5.

The microcontroller U5 includes outputs for driving four half bridge circuits 54, 56, 58 and 60. The bridge circuits 54, 56, 58 and 60 are connected between the unregulated supply V+ and ground and to an output terminal block 62 which defies the outputs C, M1, M2 and M3. Particularly, the first half bridge circuit 54 is connected to the common terminal C. The second half bridge circuit 56 is connected to the first motor output M1. The third half bridge circuit 58 is connected to the second motor output M2. Finally, the fourth half bridge circuit is connected to the third motor output M3. Thus, the first half bridge circuit 54 is common to all three motors. Each of the three other half bridge circuits 56, 58 and 60 are used to drive one of the three motors that may be connected to the terminal block 62. These circuits are necessary to provide bipolar power to drive the connected motor in both directions.

Each half bridge circuit 54, 56, 58 and 60 include a respective PNP Darlington transistor Q4, Q5, Q6 and Q14 for connection to the high side supply V+. Each is driven by a respective NPN transistor Q7, Q8, Q9 and Q15 driven by the microcontroller U5. The low side uses N channel, logic level, MOSFET transistors Q10, Q11, Q12 and Q13 gated by the microcontroller U5. Alternatively, the low side may use NPN Darlington transistors. Since the microcontroller outputs are all high impedance on power up, at least the high side switches will be off. The low side switches may be on due to static charge, or leakage current applied to the gates of the MOSFETs Q10–Q13.

In order to energize any motor to drive it in one direction, the common output C must be connected to ground as by gating the first half bridge circuit MOSFET Q10 while turning on the Darlington transistor QS, Q6 or Q14 of one of the other half bridge circuits 56, 58 and 60, respectively. To operate any such motor in the reverse direction, opposite polarity power must be applied by energizing the first half bridge circuit Darlington transistor Q4 and gating the MOSFET Q11, Q12 or Q13 of one of the other half bridge circuits 56, 58 or 60, according to which motor is to be energized.

Motor current is sensed by a resistor R6 connected between the MOSFETs Q10–Q13 and ground. The junction with the resistor R6 is in turn connected through a resistor R19 to an A/D converter 64. The A/D converter 64 includes an op amp U6A having its inverted input connected to the resistor R19. Its output is connected to the microcontroller U5. The microcontroller U5 includes four separate outputs connected through respective parallel resistors R28, R29, R30 and R31 to the non-inverted input of the comparator U6A. A resistor R27 also connects the non-inverted input to ground. To read current, the microcontroller U5 first pulls all four parallel resistors R28–R31 high by outputting the hex number 00F to port A. The microcontroller U5 then counts down toward zero. Any zeros in this number cause the appropriate port bit to go to high impedance. This takes the connected resistor R28, R29, R30 or R31, out of the divider. When the output of the comparator U6A goes low, then the motor current is known to be between the current divider value and the next higher value. This provides a reasonable approximation of current draw by any motor connected to the terminal block 62.

The control 26 also includes an external watchdog timer circuit 66 in addition to the microcontroller's internal watchdog timer. The external watchdog timer 66 is periodically pulsed by the PD5 port of the microcontroller U5.

When a user installs the control 26, it is necessary to set a jumper J5 for the type of window used. The jumper J5 includes terminals 1, 2 and 3. The jumper J5 is used to select casement, awning or skylight window operation. If a casement window, then a jumper connects pins 1 and 2 to provide window open preset set points of 33% and 66% and a pulling torque of twenty-five inch pounds. Awning window operation, selected by using no jumper, provides preset open set points of 45% and 90% and a pulling torque of forty inch pounds. Skylight window operation, selected by jumpering pins 2 and 3, provides preset open set points of 45% and 90% and a pulling torque of twenty inch pounds and an opening torque of forty-five inch pounds.

Figure 5A:
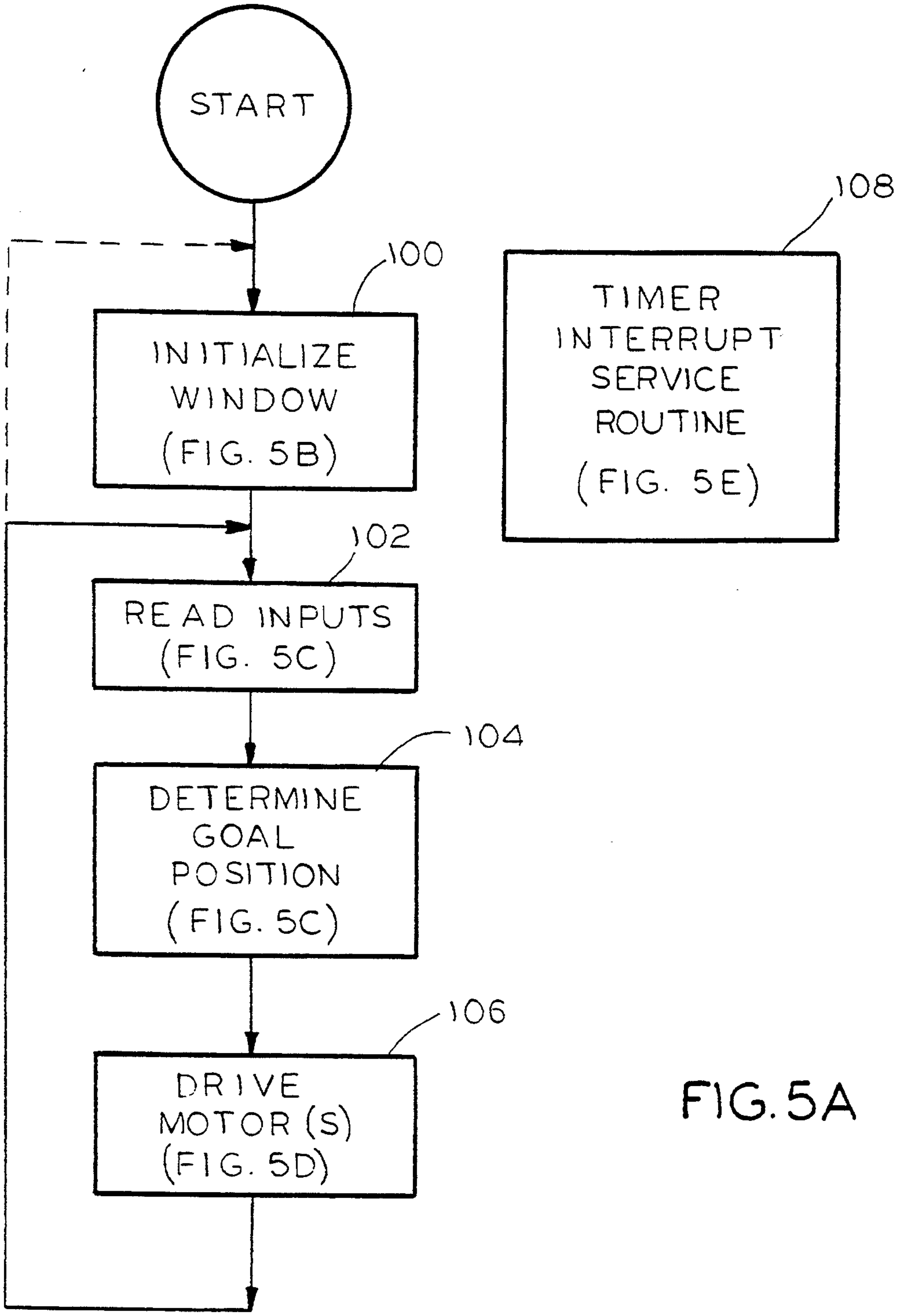
FIGS. 5A–5E comprise a series of flow diagrams illustrating operation of a control program implemented by the microcontroller of the circuit of FIG. 4.

With reference to FIGS. 5A–5E, a series of flow charts illustrate a program implemented in the microcontroller U5 for controlling the motorized window system. FIG. 5A illustrates a flow diagram for a main control loop, with the remaining flow diagrams illustrating indicated portions thereof.

At power up, the control initially implements an initialize window routine at a block 100. This routine is described below with respect to FIG. 5B. The control then implements a read inputs routine at a block 102 and a determine goal position routine at a block 104. These two routines are described below relative to the flow diagram of FIG. 5C. Then, a drive motor(s) routine is implemented at a block 106. This routine is illustrated in FIG. 5D. Control then normally returns to the block 102, although under certain instances the control may return to the block 100 to again perform initialization, as discussed below. A block 108 relates to a timer interrupt service routine which is performed as a background operation concurrently with the other illustrated routines. A flow diagram for this routine is discussed below relative to FIG. 5E.

Figure 5B:
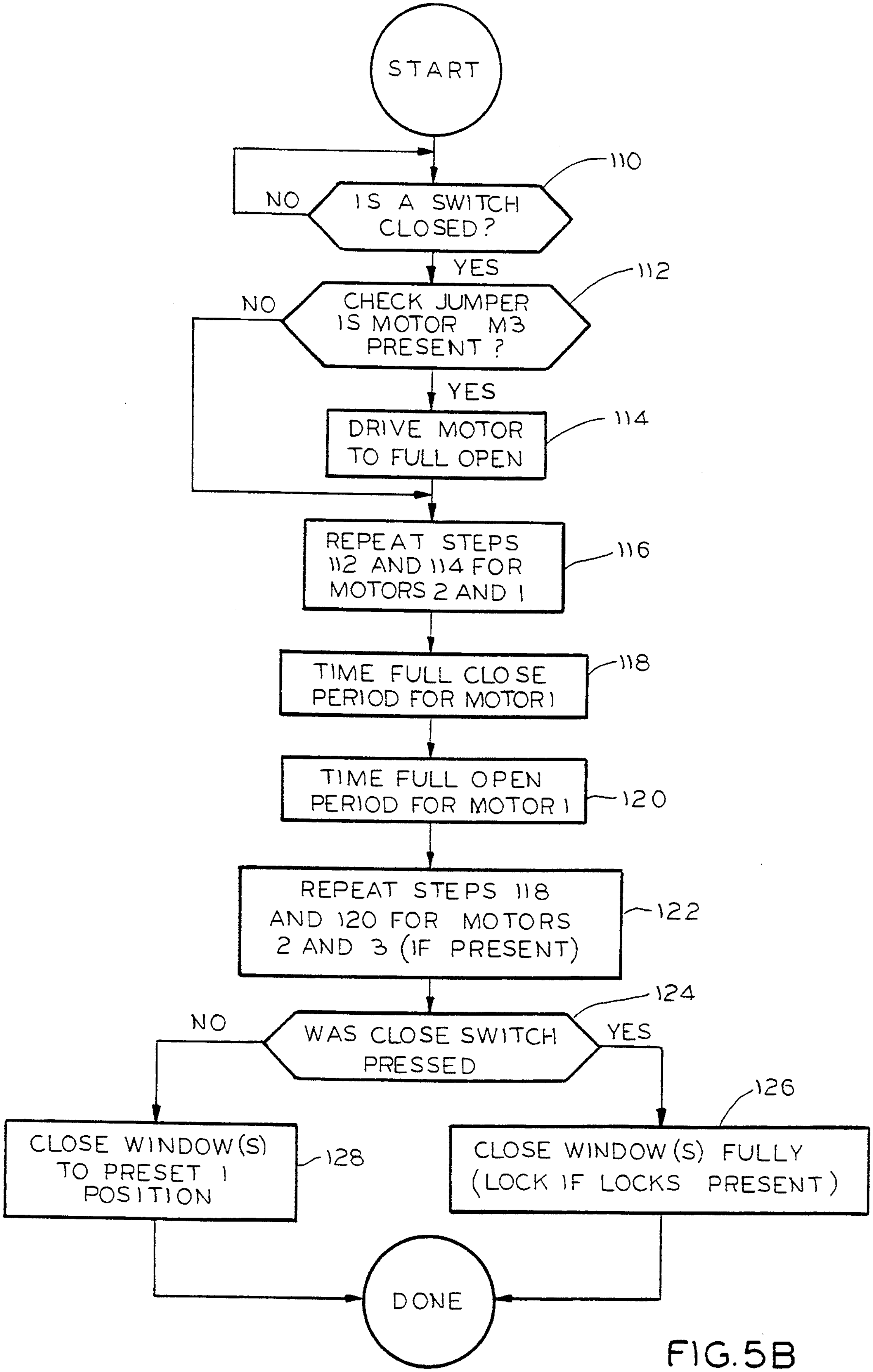

With reference to FIG. 5B, the initialize window routine is illustrated. This routine is performed only at power up or by user request, as discussed below. However, this routine is not performed until a command is received, as by closing one of the switch contacts S1 or S2, see FIG. 4, to open or close the window.

The routine begins at a decision block 110 which determines if either switch S1 or S2 is closed. If not, then control loops back until a switch is closed. At a block 112 the control checks if a jumper is absent to indicate that it should use a higher closing torque for awning windows which have no locks to guarantee a tight weather seal. The control then determines if a motor is connected to the M3 output. This is done by driving the M3 output with positive polarity power to open the motor, as discussed above, and checking if any current flows through the drive circuit. If present, then this motor is driven at a block 114 until the full open position has been reached. The control determines if the full open position has been reached by sensing a current rise when the window or lock reaches its full open position.

In accordance with the invention, the first window output M1 must always be connected to a window operator. Any locks must be connected to the second or third outputs M2 and M3. In the initialization sequence, the M3 output motor is controlled first so that any locks are opened prior to attempting to open the window.

From either block 112 or 114, the same blocks are repeated at a block 116 for any motors connected to the M2 and M1 outputs, in that order. Thus, at the end of block 116, any output devices connected to the control 26 will be in the full open position.

The motorized window system 10 according to the invention does not use any direct positional sensing. Instead, for economies, the control measures the time to traverse from full open to full closed and vice versa, with this time being used to indicate position. For example, if ten seconds is normally required to open the window and the output is energized five seconds, then it is presumed that the output device is half open. While open and close times would be generally similar for casement or awning type windows, the close time would generally be shorter for a skylight window. Therefore, each time must be measured separately.

To measure open and close times, a block 118 times the full close period for the motor connected to the M1 output. A block 120 then times the full open period for the same motor. The functions of the blocks 118 and 120 are then repeated at a block 122 for motors connected to the M2 and M3 outputs. A decision block 124 then determines if the switch closed at the decision block 110 was the close contact switch S2. If so, then at a block 126 all of the motors are driven to fully close the window and lock it, if locks are present. If not, then the windows are closed to the first preset set point position, the lower percent opening position discussed above, at a block 128. This then completes the initialization routine.

Figure 5C:
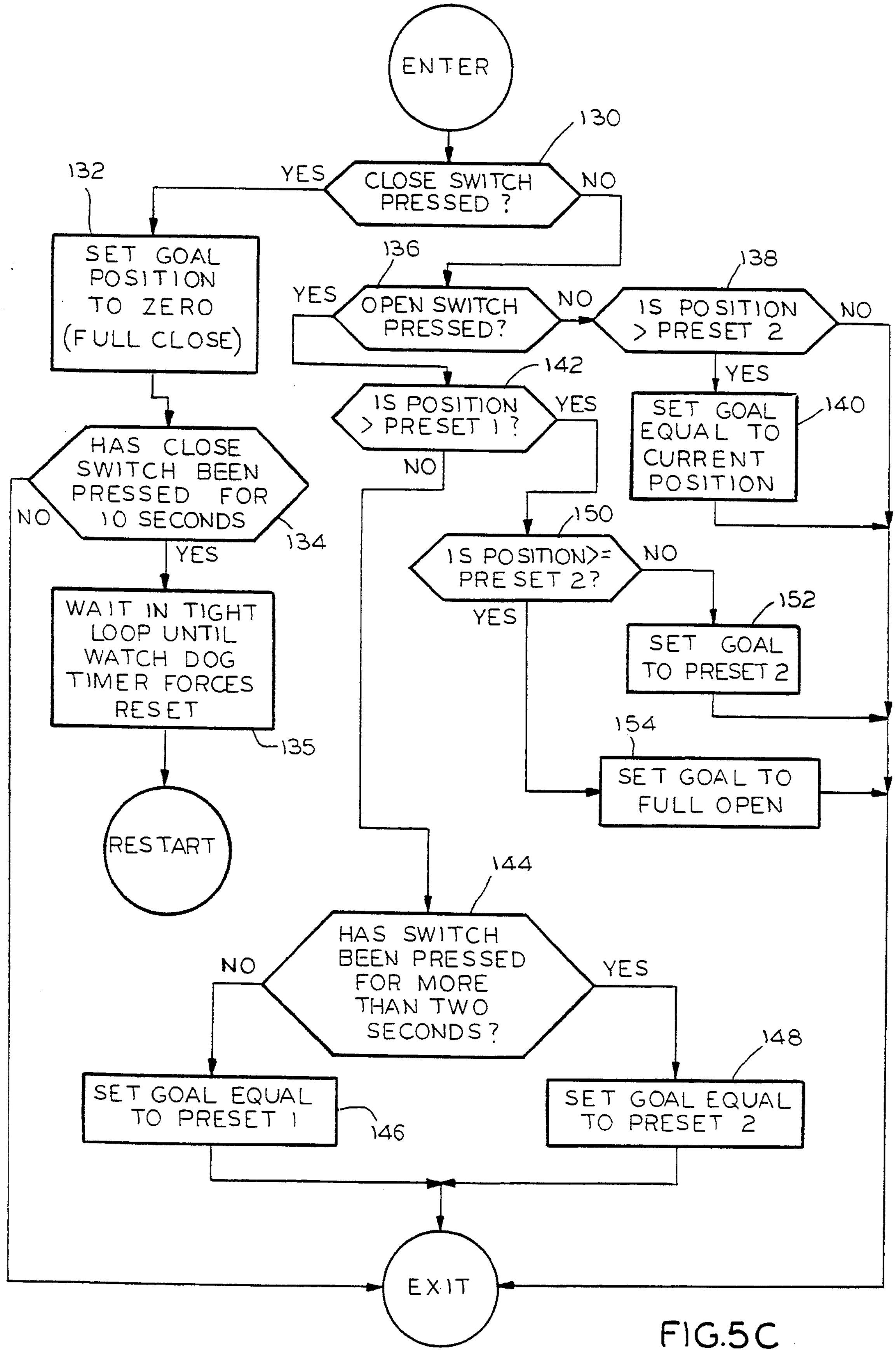
Figure 5D:
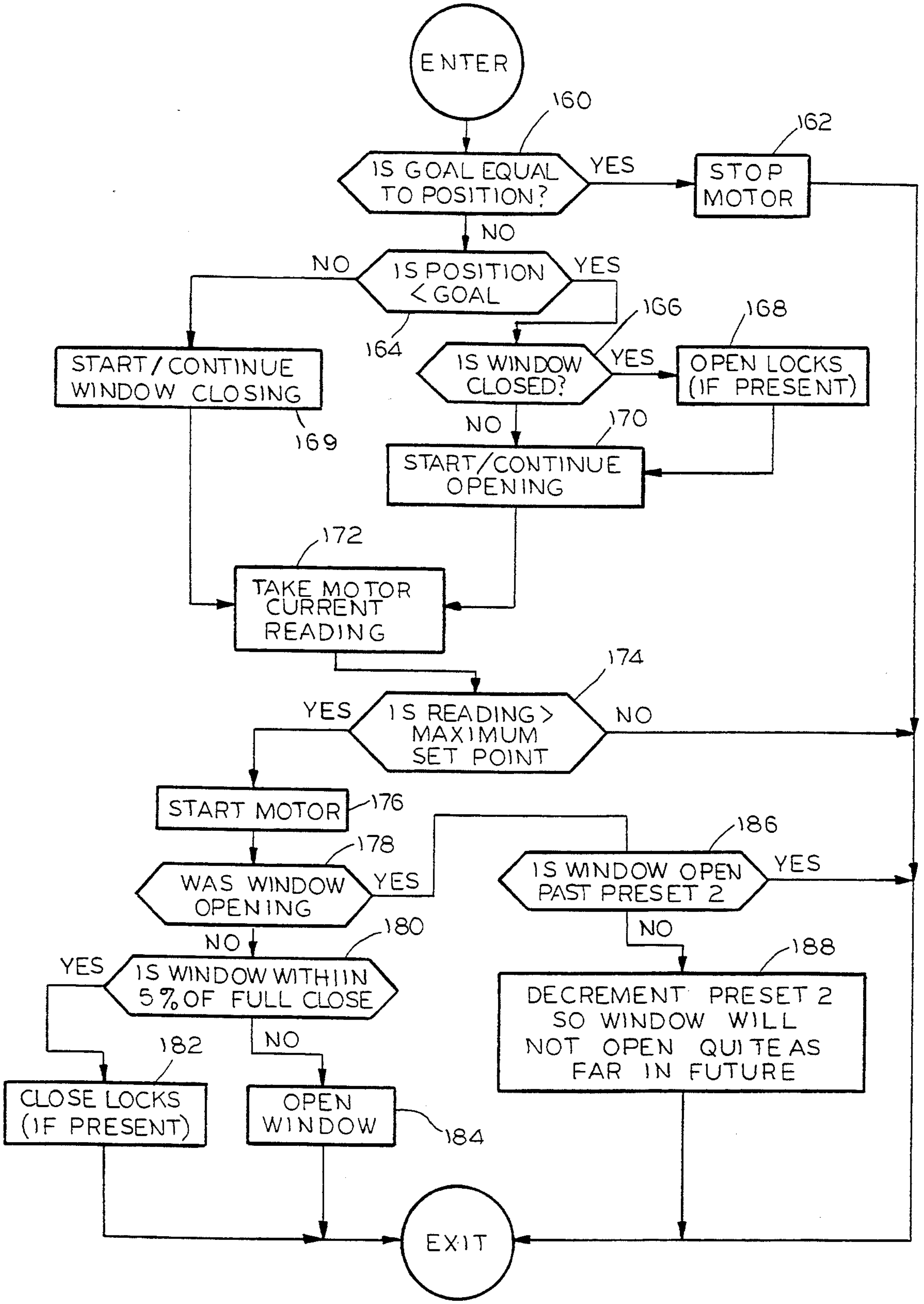

With reference to FIG. 5C, a flow diagram for the read inputs routine 102 and determine goal position routine 104, see FIG. 5A, is illustrated. This routine begins at a decision block 130 which determines if the close switch contact S2 is pressed. If so, then at a block 132 a goal, representing desired position of the window, is set to zero, i.e., full close. A decision block 134 determines if the close switch contact S2 has been pressed for ten seconds. If not, then the routine ends. If the S2 switch contact is closed for ten seconds, then this indicates a desire to perform the initialization routine. This is done by advancing to a block 136, which waits until the external watchdog timer circuit 66, see FIG. 4, forces a reset. The control is then restarted as by returning to the initialize window routine, as indicated by dashed line in FIG. 5A.

If the close switch contact S2 is not pressed, as determined at the decision block 130, then a decision block 138 determines if the open switch contact S1 is pressed. If not, then a decision block 138 determines if current window position is greater than the second preset value. If not, then the routine ends. If so, then at a block 140 the goal is set equal to the current window position. The routine then ends. If the open switch contact S1 is pressed, as determined at the decision block 136, then a decision block 142 determines if the current position is greater than the first preset value. If not, then a decision block 144 determines if the switch has been pressed for more than two seconds. In accordance with the invention, if the open switch contact S1 is pressed for less than two seconds, then the first preset value is used. If the contact is pressed for more than two seconds, then the second preset value is used. This is done by setting the goal equal to preset 1 at the block 146 or setting the goal equal to preset 2 at a block 148. The routine then ends. The second preset value can also be selected by pressing the open switch contact S1 if the current position is greater than the first preset position, as determined at the decision block 142. This is done by advancing to a decision block 150 which determines if the current position is greater than equal to the second preset position. If not, then the goal is set to the second preset value at a block 152. If so, then the goal is set equal to the full open position at a block 154. The full open position may be used, for example, as by holding the switch contact S1 down to provide, for example, for cleaning of the window. However, the window would subsequently stop if the switch contact S1 is released during the subsequent pass through the loop to the block 140, at which the goal would be set equal to the then current position.

Once a goal has been set, then the drive motors routine of FIG. 5D is implemented. This routine is operable to sequentially power the output devices in accordance with the user input set point or preset commands as represented by the stored goal. This flow diagram illustrates operation for a single window operator including motorized locks. If locks are not present, then the blocks related thereto are ignored. If multiple window operators are included, then the routine is used sequentially to open or close the motor connected to the M1 output, then fully open or close the motor connected to the M2 output, and then finally fully open or close the motor connected to the M3 output, with only one being energized at a time. Thus, the routine would be fully implemented three times if three motorized operators were used.

The routine begins at a decision block 150 which determines for the particular motorized operator if the goal is equal to the current position. If so, then the motor is stopped by deenergizing its output at a block 162 and the routine ends. If not, then a decision block 164 determines if the position is less than the goal. If not, indicating that the windows should be closed, then a block 166 starts or continues window closing. If so, then a decision block 166 determines if the window is closed. If so, and locks are present, then the locks are open at a block 168. Thereafter, at a block 170, the control either starts or continues opening of the window. As discussed above, the window is opened by connecting power to its connected output M1, M2 or M3 and closed by connecting opposite polarity power to its connected output M1, M2, or M3.

From either block 166 or 170, a block 172 takes a motor current reading using the A/D converter circuit 64. This is done to sense an increase in motor current, indicating that a full open or closed position has been reached. A decision block 174 determines of the current reading value is greater than the stored maximum set point value for the particular type of motor. This block also determines if motor current goes to zero in the event that a motorized lock 20 includes a switch contact 40, see FIG. 2, connected in series with the motor 36. This block also determines if the opposite switch contact is pressed. For example, if the window is currently opening and the close switch contact S2 is pressed. If none of these events occur, then the routine ends, so that motor operation continues. If any of these three events occurs, then the associated motor is stopped at a block 176. A decision block 178 then determines if the motor was opening. If not, meaning that the window is closing, then a decision block 180 determines if the window was within five percent of the full closed position. If so, then any locks present are closed at a block 182 and the routine ends. If the window is not within five percent of the full close position, then the increase in current was likely due to some obstruction preventing full closing of the window. Therefore, at a block 184 the window is opened for the user to attempt to eliminate any such obstruction.

From the block 178, if the window is opening, then a decision block 186 determines if the window is open past the second preset position. If so, then the routine ends. If not, then the second present is decremented at a block 188 so that the window would not open as far in the future. Particularly, as window hardware wears, it is generally more difficult to operate in the most open part of its travel. If this occurs, then the controller decreases the amount of opening slightly if a current rise causes stopping of the motor before reaching the second present position. This can extend the life of worn hardware.

Figure 5E:
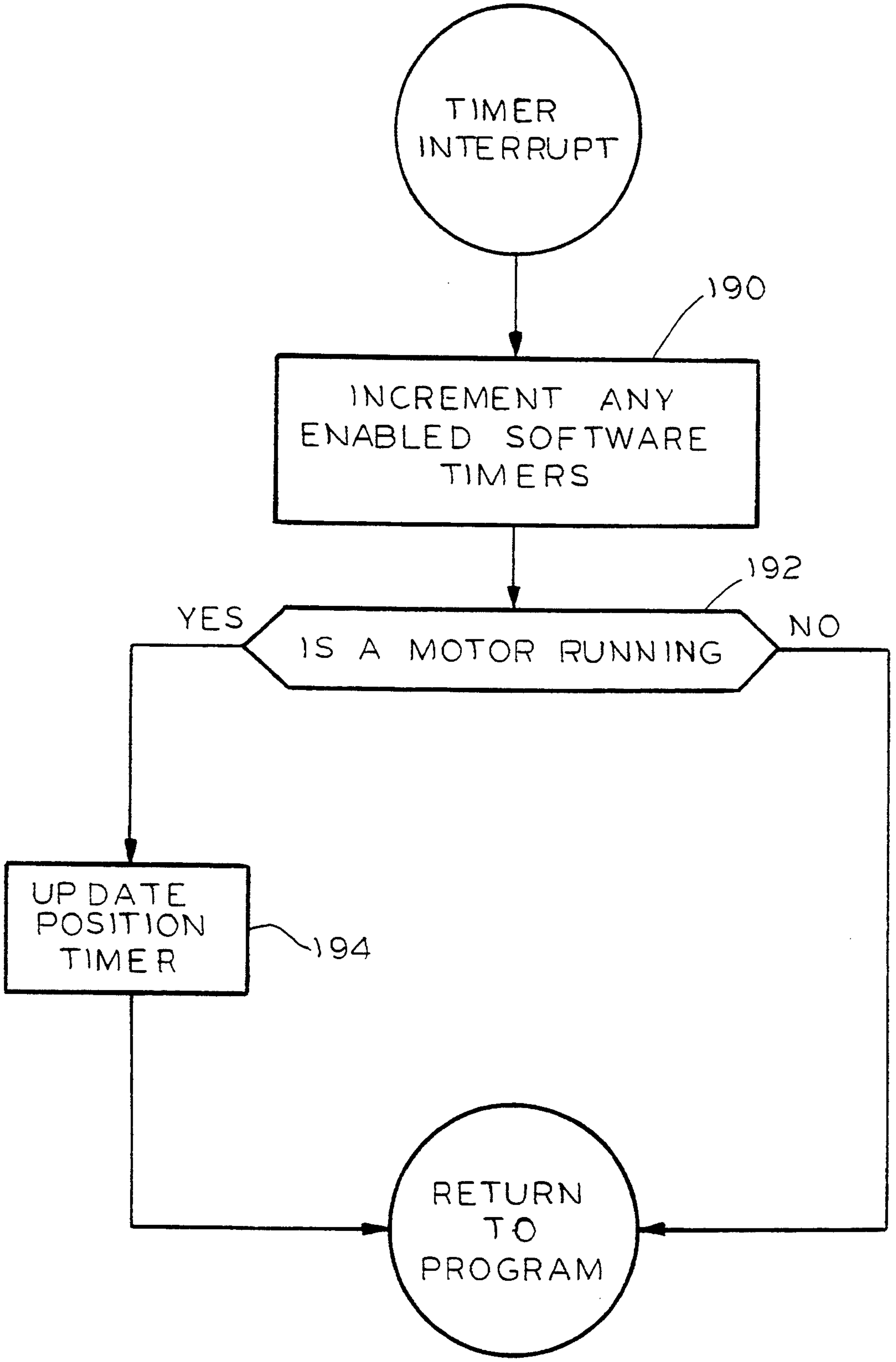

With reference to FIG. 5E, the timer interrupt service routine is illustrated. This routine begins at a block 190 which increments any enabled software timers. A decision block 192 then determines if any motor is running. If not, then control returns to the program. If so, then the position timer for the particular motor is updated at a block 194. The position timer represents the actual window position, corresponding to time of operation for storing instantaneous actual position, as discussed above.

Thus, in accordance with the invention, there is provided an economical control for controlling multiple motorized window operators or a motorized window operator with locks. When locks 20 are present, a window opening sequence proceeds by first opening the locks 20 and then operating the window operator 18 to open to a partial open position, i.e. one third open for a casement window. After it stops, then pressing the open switch contact S1 again causes the casement window to open to the two-thirds open position. Either is done by running the motor for a percentage of time period required for full opening. Further opening can be commanded by again depressing the open switch contact S1. When the switch contact S1 is released, or full opening is achieved, then the motor 36 stops. When the close switch contact S2 is pressed, then the window will start closing until the lock switch contact 40 breaks its circuit or until a current rise signals the window is fully closed or has encountered an obstruction. The screen interlock switch 34 also breaks the current to the motor 36 to guard against entrapment from the inside of the structure. The window can be stopped at any time by momentarily pressing the button opposite of the direction the window is moving. If held, or pressed a second time, then the window will start in the desired direction. By not normally opening the window to the full open position, hardware life is increased.

When locks are not present, the sequence similar to that above is followed sequentially for a first window, a second window and then a third window, ignoring reference to opening or closing locks. As above, the first and second presets for open position vary according to whether a casement window, awning window or skylight window is used.

I claim:

1. A universal electrical control for selectively driving either plural motorized window operators for opening or closing one or more windows or a motorized window operator and plural motorized locks for opening, closing and locking a window, the electrical control comprising:

an interface circuit for connection to plural output devices comprising either motorized window operators or motorized window locks;

input means for commanding window movement to an open or close position;

a control circuit connected to said interface circuit and said input means and including initialization means for determining if each said output device is a motorized window operator or a motorized lock, and output drive means operable in response to a command from said input means for driving said output devices through said interface circuits in a lock sequence or a window sequence dependent on said initialization means respectively determining if a motorized window lock is connected or is not connected to said interface circuit, said lock sequence comprising opening any lock prior to opening the window and closing the window prior to closing the lock, the window sequence comprising driving the plural motorized window operators in a select desired sequence.

2. The electrical control of claim 1 wherein said output drive means drives any said motorized window operator to one of a plurality of select window open positions according to a length of time an open command is received from said input means.

3. The electrical control of claim 1 further comprising a power source and all output devices are powered from said power source.

4. The electrical control of claim 1 further comprising current sense means for sensing current drawn by said interface circuit in powering any said output device.

5. The electrical control of claim 4 wherein said initialization means is operatively associated with said current sense means for driving each said output device and determining if such driven output device is a motorized window operator or a motorized lock in accordance with current sensed by said current sense means.

6. The electrical control of claim 4 wherein said initialization means is operatively associated with said current sense means for driving each said output device to a full open position as determined by sensed current and then driving such output device to a full closed position and then full open position and determining length of time to open or close the window for using in determining window position.

7. The electrical control of claim 4 wherein said output drive means drives any said motorized window operator to a select window open position and further comprising means for varying said select position if a select high current level is sensed prior to the window opening to the select position.

8. An electrical window operator control for driving plural motorized window operators for opening or closing one or more windows or motorized locks for locking a window, the electrical control comprising:

- an interface circuit for connection to plural output devices comprising either motorized window operators or motorized window locks;
- input means for commanding window movement to an open or close position;
- a control circuit connected to said interface circuit and said input means and including initialization means for driving each said output device to cycle said output device to determine time to open or close the window or open or close the lock, said time being used to determine actual position according to subsequent length of time any such output device is driven, and output drive means operable in response to a command from said input means for driving said output devices through said interface circuits until actual position reaches a position commanded by said input means.

9. The electrical control of claim 8 wherein said output drive means drives any said motorized window operator to one of a plurality of select window open positions according to a length of time an open command is received from said input means.

10. The electrical control of claim 8 further comprising a power source and all output devices axe powered from said power source.

11. The electrical control of claim 8 further comprising current sense means for sensing current drawn by said interface circuit in powering any said output device.

12. The electrical control of claim 11 wherein said initialization means is operatively associated with said current sense means for driving each said output device and determining if such driven output device is a motorized window operator or a motorized lock in accordance with current sensed by said current sense means.

13. The electrical control of claim 11 wherein said initialization means is operatively associated with said current sense means for driving each said output device to a full open position as determined by sensed current and then driving such output device to a full closed position and then full open position and determining length of time to open or close the window for using in determining actual window position.

14. The electrical control of claim 11 wherein said output drive means drives any said motorized window operator to a select window open position and further comprising means for varying said select position if a select high current level is sensed prior to the window opening to the select position.

15. A motorized window operator system comprising:

- a motorized window operator mountable to a window for opening or closing the window, the window including a sash movable relative to a frame;
- a motorized lock mountable to the window for securing the sash closed against the frame;
- a bridge circuit for connection to both said motorized window operator and said motorized window lock;
- input means for commanding window movement to an open or close position;
- a control circuit connected to said bridge circuit and said input means and including position command means for setting a desired window position in response to a command from said input means, and output drive means for driving said motorized window operator and said motorized window lock through said bridge circuit in a select sequence, said sequence comprising opening said lock prior to opening the window to the desired window position and closing the window prior to closing the lock.

16. The motorized window operator system of claim 15 further comprising current sense means for sensing current drawn by said bridge circuit in powering said motorized window operator and said motorized window lock.

17. The motorized window operator system of claim 16 wherein said current sense means is connected to said control circuit and said output drive means is operable to close said window until a high current is sensed by said current sense means.

18. The motorized window operator system of claim 17 wherein said motorized lock includes a switch contact connected in series with said motorized window operator, said switch contact opening to shutoff said motorized operator when said window is closed and said output drive means is deenergized if a loss of current is sensed by said current sense means.

19. The motorized window operator system of claim 18 wherein said motorized lock includes a diode connected across said switch contact so that said output drive means can open said window when said contact is open.

* * * * *